L. STEVENS.
HAT SHAPING MACHINE.
APPLICATION FILED DEC. 6, 1910.

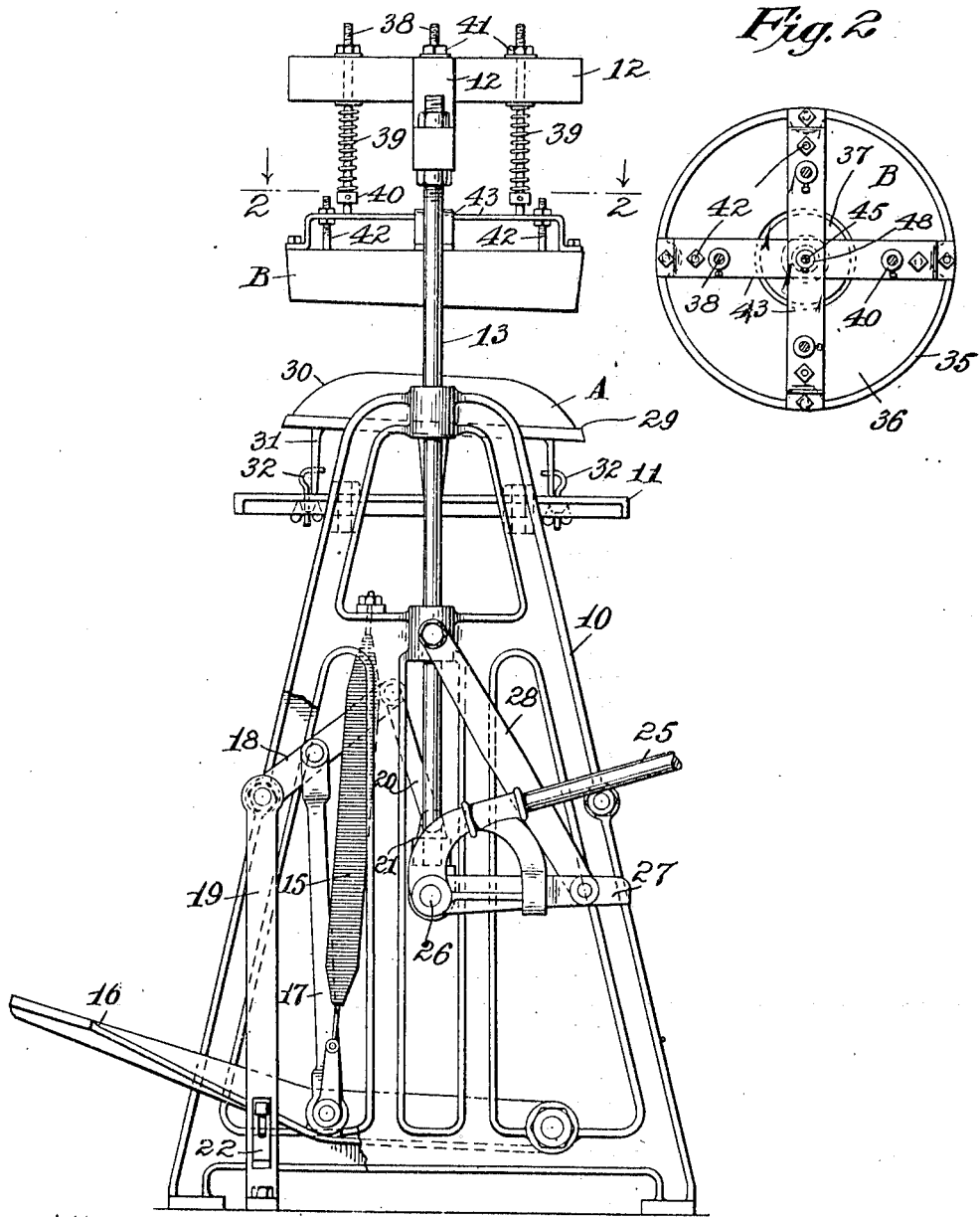

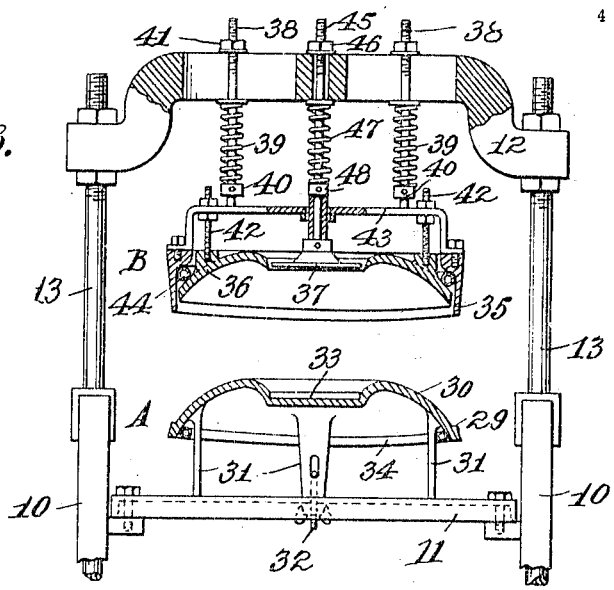

1,053,669.

Patented Feb. 18, 1913.

4 SHEETS—SHEET 3.

Attest:

Inventor:
Leslie Stevens
by Arthur L. Kent Atty.

L. STEVENS.
HAT SHAPING MACHINE.
APPLICATION FILED DEC. 6, 1910.

1,053,669.

Patented Feb. 18, 1913.

4 SHEETS—SHEET 4.

Attest:
W. F. McGuire
Edgeworth Greene

Inventor.
Leslie Stevens
by Arthur L. Kent Atty

UNITED STATES PATENT OFFICE.

LESLIE STEVENS, OF GLEN RIDGE, NEW JERSEY.

HAT-SHAPING MACHINE.

1,053,669.   Specification of Letters Patent.   Patented Feb. 18, 1913.

Application filed December 6, 1910. Serial No. 595,886.

*To all whom it may concern:*

Be it known that I, LESLIE STEVENS, a citizen of the United States, residing at Glen Ridge, county of Essex, and State of New Jersey, have invented certain new and useful Improvements in Hat-Shaping Machines, fully described and represented in the following specification and the accompanying drawings, forming a part of the same.

This invention relates to a machine and apparatus for shaping hats; and the object of the invention is to provide a machine and shaping devices to take the place of hat shaping dies and presses such as have heretofore been used, and which will also be adapted for shaping high grade hats of fine felt, velvet, plush or other materials such as have heretofore been shaped by hand, and the invention aims further to provide apparatus which by simple adjustment of parts may be adapted for shaping various materials and for various grades of work which have heretofore required separate and different apparatus.

The invention makes it possible to shape on a heated form or die in a machine or press, without spotting, glazing, mirroring or otherwise injuring the surface of the material, complete hats or hat brims of materials such as fine felt or velvet or plush, which cannot be shaped without such damage in ordinary heated dies, and this without sacrificing the advantage of quick drying and setting of the ordinary heated pressing dies. In short, the invention provides a machine or press and shaping devices which will not only do the work of the ordinary hat shaping press and dies but will also shape complete hats or hat brims of a grade or kind which it has not been practicable to produce by machine before and which are equal to if not better than those produced by the slow and expensive method of hand shaping. An important result of the invention, therefore, is to greatly lessen the expense of shaping high grade hats.

Figure 5:
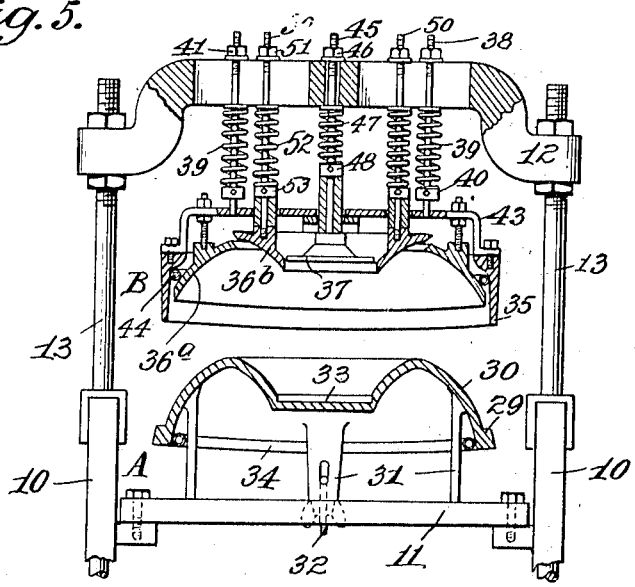
Figure 6:
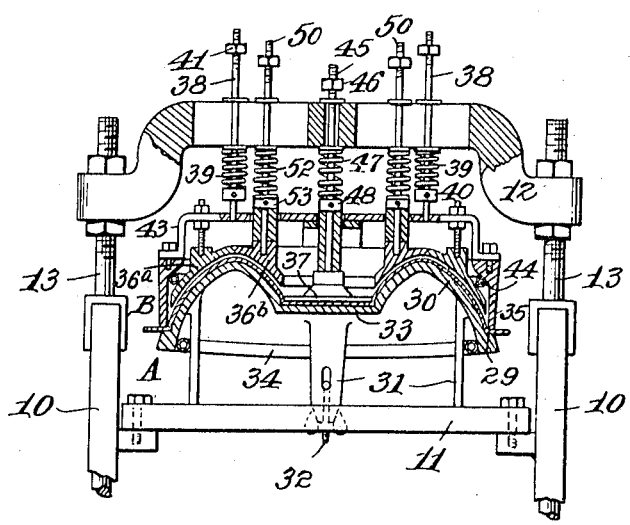
Figure 7:
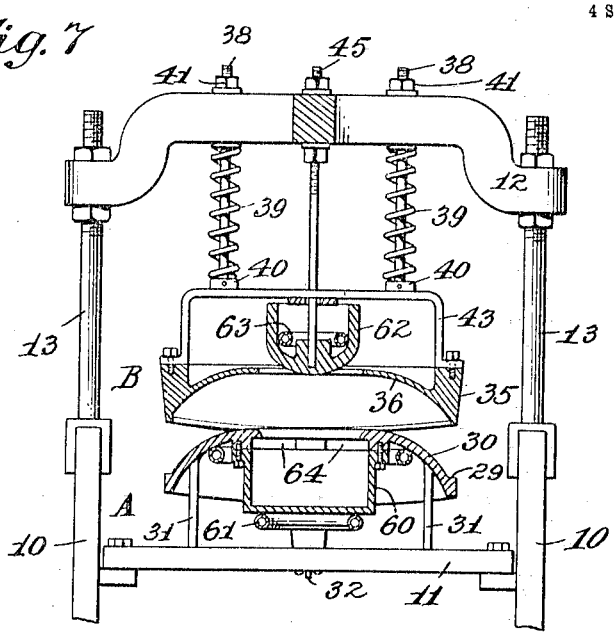
Figure 8:
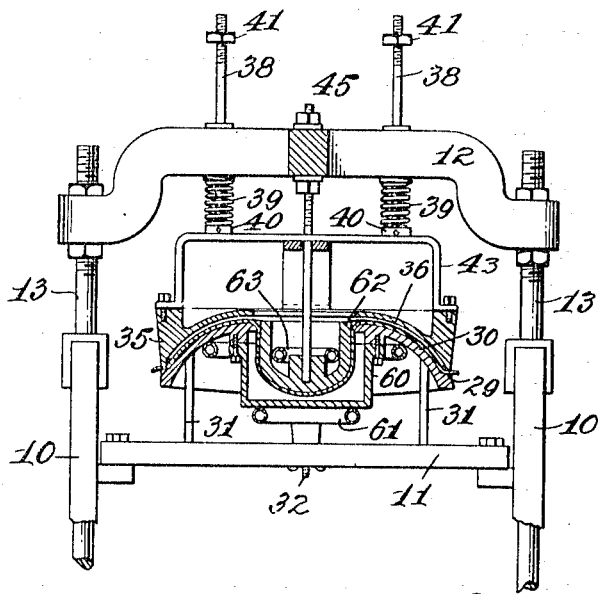

A full understanding of the invention can best be given by a detailed description of a press and shaping members embodying the same in preferred forms, and such a description will now be given in connection with the accompanying drawings, in which, Figure 1 is a side view of a hat-shaping machine constructed in accordance with the invention. Fig. 2 is a sectional plan view taken on line 2 of Fig. 1. Fig. 3 is a front view partly in section of the upper part of the machine with shaping members as shown in Fig. 1. Fig. 4 is a view similar to Fig. 3, but showing the shaping members in closed or operative position. Figs. 5 and 6 are views similar to Figs. 3 and 4 but showing a lower shaping member of different shape and a modification of the upper member. Figs. 7 and 8 are views similar to Figs. 3 and 4 but showing shaping members for shaping both the crown and brim of a complete hat.

Referring to the drawings, and first to Figs. 1 to 4, the various operative parts of the machine are carried by two side frames 10. Supported between and near the upper ends of the side frames is a table or bed 11 which carries the lower shaping member A. The upper shaping member B is hung from a cross head 12 which is carried by two vertical sliding rods 13 mounted in bearings in the side frames 10, the cross head being mounted so as to be vertically adjustable on the rods 13 as shown. The rods are normally held in the position shown in Figs. 1 and 3 with the cross head and upper shaping member B in their raised position by springs 15, and are moved downward against the tension of the springs to lower the cross head and upper shaping member by means of a foot treadle 16 which is connected by a link 17 with a lever 18 pivotally mounted on the support 19 and having its free end connected by a link 20 with a cross bar 21 extending between the lower ends of the rods 13. When the treadle has been depressed to give the full downward movement to the cross head, it is held by a catch 22 to lock the cross head and shaping member B against upward movement. A hand lever 25 is also provided by which the rods 13 may be operated to lower the cross head, but which is especially intended for applying greater power in drawing the cross head downward after it has been given the greater part of its movement by means of the foot lever. This hand lever 25 is fast on a shaft 26 mounted in bearings at the ends of the cross bar 21, which shaft 26 carries at each end an arm 27 which is pivotally connected to one end of a link 28, the other end of which is pivoted to one of the side frames. When the hand lever 25 is thrown over to the left from the position shown in Fig. 1, therefore, the rods 13 will be forced downward by the action of the arms 27 and the links 28, and, similarly, if the rods 13 are drawn downward by the depression of the treadle 16, the hand lever will be thrown over to the left from the position shown in Fig. 1; and when the rods 13 have been given nearly their full downward movement, the arms 27 and links 28 will have been brought into a position in which they stand nearly in line with each other so that a comparatively slight force applied to the hand lever 25 will cause a very strong downward pull to be exerted on the rods 13 and the cross head.

The general construction of the press with its operating treadle and hand lever and connections as above described is that of a press of well known construction and which is well adapted to the present invention, but which in itself forms no part of the present invention.

The lower shaping member will be shaped according to the shape to be given to the hat or hat brim, and may be an ordinary lower die member such as is commonly employed for shaping hats in a die press, being provided, however, with a clamping rim or shoulder 29. As shown in these figures, it consists of an imperforate metal brim form or lower die member 30 of the desired shape for shaping a hat brim and having legs 31 which rest on the table 11 and are engaged by clamping hooks 32 to hold the form in place in the usual manner. The form is provided with an integral flange which forms the clamping shoulder 29, and, as shown, its shaping surface is of arched form having a general upward slope from the edge through the greater part of its shaping surface and then sloping downwardly from the high line to a central opening or depression 33 which preferably has vertical sides to shape the head band of the brim, and which for drying the central portion of the material being shaped is, for a form or die for shaping a brim only, preferably closed by a bottom drying plate as shown. The form may be heated in any suitable manner, a burner pipe 34 perforated in the usual manner being shown for this purpose.

The upper shaping member B, which is hung from the cross head 12, comprises in the form shown in Figs. 1 to 4 an upper clamping part or ring 35, shaped to correspond to and coact with the clamping shoulder 29 of the lower shaping member, an upper die member or heating member 36 which has its under surface formed to correspond with the shaping surface of the lower die member or brim form 30, and which is adapted to act either as an upper pressing die or as a non-contacting die or heating member, and a central pusher or band plate 37. The clamping ring 35 is hung from the cross head by rods 38 which are free to move upward through the cross head and are provided with compression springs 39 bearing against the underside of the cross head and against collars 40 on the rods so that when the cross head has been moved down to carry the clamping ring into clamping position to clamp the edge of the hat body or blank between it and the shoulder 29, a further downward movement may be given to the cross head during which the clamping ring will be pressed downward by the springs 39 and the springs will be compressed as shown in Fig. 4.

Means such as the nuts 41 on the rods 38 are provided for limiting the downward movement of the rods relatively to the cross head and for adjusting the normal position of the clamping ring vertically with relation to the cross head, and the collars 40 are adjustable on the rods for adjusting the pressure of the compression springs 39. The upper die member or part 36 is mounted to move with the clamping ring, and in the construction shown is adjustable vertically with relation thereto and removable therefrom, being for this purpose carried by threaded rods 42 extending through cross bars 43 and secured thereto by upper and lower nuts as shown. Suitable means are provided for heating the part 36, such as the usual perforated burner pipe 44. The pusher or band plate 37 is hung from the cross head independently of the clamping ring and part 36 by means of a central rod 45 which passes freely through the cross head and cross bars 43 and is limited in its downward movement by adjustable means such as the nut 46 and has a compression spring 47 interposed between the under side of the cross head and an adjustable collar 48 to permit upward movement of the rod and pusher relatively to the cross head against the pressure of the spring. Obviously, the clamping ring and the central pusher may be relatively adjusted so as to cause either one or the other to come into operation in advance of, or more or less in advance of, the other.

In using the machine, the properly dampened hat blank or material to be shaped is placed over the lower heated shaping member with its edges extending over or beyond the clamping shoulder 29. The cross head is then lowered to lower the upper shaping member, and with the parts adjusted as shown the clamping ring first clamps the edge or outer portion of the material between it and the shoulder 29. The downward movement of the cross head being continued, the band plate 37 then forces the central portion of the material down into the depression 33 thereby drawing the material tightly over and stretching it against the shaping surface of the form 30.

The upper die member or part 36 may be set relatively to the clamping ring 35 so that this part and the lower die member or form 30 will coöperate as upper and lower pressing dies to press the blank or material to be shaped between them in the usual manner. This method of shaping hat brims is objectionable, however, with some materials, the pressure of the heated surface of the die causing, for example, felt to become glazed and spotted and pile-fabrics such as velvet and plush to become flattened or mirrored. The convex side of a hat brim is usually the side exposed to view, and to avoid such injury to the surface of the material on the convex or exposed side of the brim while retaining the advantage of quick drying resulting from the use of an upper heated die member, the upper die member or part 36 in my apparatus is adjusted with relation to the clamping ring 35 so that when the clamping ring has been moved down into clamping position to clamp the edge of the material between it and the shoulder 29, the lower surface of the part 36 will have been brought close to the lower shaping surface but not so close that the material being shaped will be pressed between the two surfaces. Preferably, and as shown in Fig. 4, the part 36 will be set so that it will stand, when the clamping ring is in clamping position, with its lower surface just clear of the material lying on the lower shaping member.

When the part 36 is so adjusted, and with the clamping ring and central pusher relatively adjusted as shown, the lowering of the cross head will first bring the clamping ring down into operative position to clamp the edge of the material against the shoulder 29 and the part 36 into position to heat without pressing against the material on the form 30, and then by the continued movement of the cross head while the clamping ring and part 36 are held by the pressure of the springs 39 the band plate 37 forces the central portion of the material down into the depression 33, as before described. It will be observed, that during the time the band plate is forcing the central portion of the material downward the material is held only by the continuous clamping ring at the edge of the form 30, with the result that it will be drawn and stretched uniformly over the form 30 by the downward movement of the band plate. Such uniform stretching of the material insures a uniform thickness and absence of strains in the finished product. It will be observed, further, that with the part 36 so set, as shown in Figs. 3 and 4, so as to come close to but not into actual contact with the material on the form 30, all danger of injuring the surface of the material on the convex or visible side of the brim being formed is avoided, while, at the same time, the hot heat-radiating face of the part 36 is so close to the material stretched on the form as to aid in the drying of the material. Having the part 36 so set not only prevents glazing and flattening or mirroring of the material, but, by permitting the escape of the steam driven from the heated wet or dampened material by the hot lower form on which it is stretched, avoids the spotting of the material and the drawing of the stiffening substance to the surface of the material which is apt to occur in shaping felt, and other materials between contacting or pressing dies. And, furthermore, by providing for the free escape of the steam with the upper die member close to the material stretched on the form 30, the drying and setting of the material is effected even quicker than with contacting dies. In shaping pile fabric, a further advantage of shaping the brim by stretching the material over the form 30 without bringing the die or part 36 into contact with it results from the fact that the steam escaping freely from the body of the fabric tends to lift and straighten up the pile of the fabric. Since the avoidance of damage to the outer surface of the material, or the visible side of the brim being shaped results from shaping the brim by stretching it on the form 30 without bringing the upper die member or part 36 in contact with the material, this result might be secured by entirely removing the part 36. It may be desirable in some cases to use the machine with the part 36 removed or to omit such part entirely from the upper shaping member, and depend solely on the heated form 30 for drying the material stretched thereon. The form 30 being imperforate and being maintained suitably hot by the flames from the burner pipe 34 or other suitable means, forms an efficient moisture-expelling source of heat for drying the material stretched thereon. Without the heat-radiating member 36, however, the drying will be slower with some materials, and with such materials it should be used to obtain the full benefit of this feature of the invention of quick production of a high grade product.

It will be observed that the shaping face of the brim form 30 as shown is, as before pointed out, arched in cross-section, or rounded upwardly, or outwardly from the body of the form, the outer portion, which slopes upwardly and inwardly, being of a general convex shape, or inclined outwardly, and the inner portion, which slopes downwardly from the high line, being of a general concave form, or inwardly inclined; and that the form or contour of the shaping face is therefore such as to cause the material of a hat body or blank stretched thereon by the edge holding means and the pusher, or inner holding means, to be held by the tension thereon tightly and smoothly against the surface of the form. In order that the material when stretched over the form by holding means engaging the edge and central portions of the material shall be tensioned tightly and smoothly against the form throughout its whole extent, it is necessary that the form shall have a convex, or outwardly inclined, shaping face or a suitably arched shaping face, or one which is both arched and either wholly or partly convex, the face of the forms shown in Figs. 1 to 6 being arched and partly convex, that is, convex, or outwardly inclined, in their outer portion; and in order that the hat brim may be properly shaped to the shape of the brim form by being stretched in a moistened condition over the face of the heated form, it is, of course, necessary that the material shall be so stretched over the form as to lie smooth and close against, or closely hug, the shaping surface.

In some cases, and particularly when the shaping members are formed to shape a hat brim which is deeply mushroomed, or deeply rolled, and, having a considerable or deeply inclined portion between the crown of the hat, or the head band of a separate hat brim, and the low line of a downwardly convex brim or the high line of an upwardly convex brim, it is desirable for securing the best results that the central portion of the material shall not be pressed downward too far below the high line of the lower die or form 30 until the edge of the material has been clamped to the shoulder 29. To secure this result while retaining the advantage of having the upper die member brought into close heating proximity to the material or if so desired into pressing contact therewith, the upper shaping member is made so as to provide for a relative movement between its clamping ring and its die member or a part thereof during the seating of the upper shaping member. A construction providing for such relative movement between a part of the upper die member and the clamping ring is shown in Figs. 5 and 6. As shown in these figures, the lower shaping member A is similar to the shaping member A shown in Figs. 1 to 4, but the form 30 is more sharply arched and has a larger part of its shaping surface inclined downwardly and inwardly from its high line, so as to shape a hat brim with a wider and more sharply inclined inner portion. In shaping a hat brim on a form of this shape, if the central portion of the material is pressed too far downward into the concave central part of the form, the material is apt to be drawn inward on the form so that its outer portion, when clamped at the edges or pressed against the outer part of the form, is liable to be wrinkled; but such wrinkling of the material will be avoided by clamping the material between the clamping ring 35 and the shoulder 29 before the central portion of the material has been pressed downward too far below the high line of the form 30. The upper shaping member as shown in these figures has a clamping ring 35 hung from the cross head 12 by spring-pressed, adjustable rods 38, as shown in Figs. 1 to 4, and a central pushed or band plate 37 hung independently from the cross head by an adjustable spring rod 45, but in place of the single-piece upper die member or part 36 of the construction shown in Figs. 1 to 4, the shaping member has an upper die member formed of two parts or sections 36$^a$ and 36$^b$, the outer section 36$^a$ having its under surface shaped to correspond to the shape of the outer part of the form 30 and the inner section 36$^b$ having its under face shaped to correspond to the inner part of the form 30, so that the two sections when brought together as in Fig. 6 provide an under surface corresponding to substantially the whole of the shaping surface of the form 30. The line of separation between the two sections preferably coincides substantially with the high line of the form 30, and the abutting edges of the two sections are formed so that the inner section will seat against and be limited in its downward movement by the outer section. The outer section 36$^a$ is mounted like the single part 36 of Figs. 3 and 4 to move with the clamping ring 35 and to be adjustable vertically with relation thereto, and the inner section 36$^b$ is hung from the cross head independently of the clamping ring and part 36$^a$ by means of rods 50 which are limited in their downward movement by adjustable means, such as the nuts 51, and have springs 52 which bear against the under side of the cross head and against adjustable collars 53 on said rods, so that the part 36$^b$ will be normally held in position at the downward limit of movement of the rods 50, as shown in Fig. 5, and will be free to move upward relatively to the cross head against the pressure of the springs 52.

When making use of the sectional or two-part upper die member for delaying the pressing down of the central portion of the material on the form 30, the inner section 36$^b$ is set by adjustment of the nuts 51 to stand normally, or when the cross head is elevated, in a position with relation to the outer section 36$^a$ above its operative position with relation to said section. It will be understood, however, that the inner section may be adjusted to stand at all times and in all positions of the shaping member B in operative position with relation to the outer section. It will also be understood that the outer section may be set with relation to the clamping ring so that the two sections of the upper die member will co-act with the form 30 to press the material between them, or so that the sections of the upper die member will in their downward movement stop short of contact with the material on the form 30, as shown in Fig. 6.

In the operation of the machine with shaping members as shown in Figs. 5 and 6, and with the outer section of the upper die member set so as not to contact with the material on the form 30 and with the inner section set to stand normally with relation to the outer section above its operative position with relation to said section, the material to be shaped is placed over the form 30 with its edges extending over or beyond the shoulders 29, and, the cross head being then lowered, the clamping ring 35 clamps the edge of the material to the shoulder 29 and the outer section 36ᵃ of the upper die member comes into position, as shown in Fig. 6, before the central portion of the material has been depressed to any considerable extent below the high line of the form 30. Then, by the continued downward movement of the cross head, the inner section 36ᵇ of the upper die member is moved farther downward until its downward movement is limited by engagement with the part 36ᵃ when it is in the position shown in Fig. 6, and the pressure or band plate 37 is moved downward relatively to the other parts of the upper shaping member to force the central portion of the material down and into the depression 33, thereby stretching the material evenly and uniformly over the form 30 and forming the head band as before. It will be noticed that in Figs. 5 and 6, and also to a lesser degree in Figs. 1 to 4, the central portion of the material is depressed below the higher portion of the brim form before the edge of the material is held by the edge clamping ring and is further depressed after the edge of the material has been clamped by the clamping ring.

Figs. 1 to 6 show shaping members for shaping a hat brim only without the crown. In Figs. 7 and 8 shaping members for shaping both the brim and the crown of a complete hat are shown. The lower shaping member, as shown in these figures, has a form 30 with a peripheral clamping shoulder 29 as in the other views and the form will be shaped according to the shape to be given to the hat brim. The form has a central through opening and has secured on its underside beneath the opening a heating shell 60 of a size sufficiently large to receive the crown of the hat. This shell may be of any suitable form and heated in any suitable manner, as by means of the usual perforated heating pipe, as shown at 61. The upper shaping member B has a clamping ring 35 such as is shown in the other views to co-act with the clamping shoulder 29 and which is hung from the cross head by means permitting an upward movement of the ring against spring pressure, and has also a die member 36 which as here shown is not adjustable relatively to the clamping ring but is secured in permanent adjustment thereto in position to act as a non-contacting die or heat radiating part; and in place of the band plate 37, the central rod or plunger 45 carries a pusher in the form of a crown form 62, and instead of being mounted so as to be movable upward relatively to the cross head, the rod 45 is preferably secured to the cross head so as to be incapable of endwise or upward movement relative thereto, but by means, such as the nuts shown, which provide for upward and downward adjustment of the rod and of the crown form carried thereby. The crown form may be of any suitable shape and construction, but for the best results and quickest drying and setting of the hat it is of metal and of hollow form and heated by suitable means such as the perforated heating pipe 63.

In using the press with shaping members as shown in Figs. 7 and 8, the material, which will be some stretchable material, such as felt, is placed over the form 30, and the cross head being then lowered the edge of the material is clamped between the clamping ring and the shoulder 29 before any or any considerable depression of the central portion of the material through the central opening of the form 30. Then by the continued downward movement of the cross head the crown form is pushed down through the opening in the form 30 to the position shown in Fig. 8, drawing the central portion of the material down through the opening in the form 30 and stretching the material uniformly against the form 30 and about the crown form. The brim of the hat thus formed is quickly dried and set as it lies against the heated form 30; and a crown is similarly dried and set as it lies against the heated crown form, the drying of the crown being further aided by the heat from the heated shell 60, and any steam given off from the crown escaping from the interior of the shell through the openings around its upper edge, shown at 64.

It will be understood that the invention is not to be limited to the exact constructions shown and to which the foregoing description has been largely confined, but that it includes changes and modifications thereof within the claims.

What is claimed is:

1. In a hat shaping machine, the combination with a press having opposed supporting members and means for reciprocating one of said members toward and from the other, of a brim shaping die mounted on the lower supporting member, and an upper shaping member carried by the upper supporting member and comprising an outer edge clamping ring, a die member, and a central pusher, the clamping ring and die member being yieldingly supported and standing normally in position to come into operation ahead of the pusher, and adjusting means for varying the relative final operative positions of the clamping ring and die member in the direction of the movement of the reciprocating supporting member.

2. In a hat shaping machine, the combination with a press having opposed supporting members and means for reciprocating one of said members toward and from the other, of a brim shaping die mounted on the lower supporting member, and an upper shaping member carried by the upper supporting member and comprising a yieldingly supported outer clamping ring, a non-contacting die member, and a central pusher mounted to come into operation after the clamping ring; and means for heating said die and die member.

3. In a hat shaping machine, the combination with a press having opposed supporting members and means for reciprocating one of said members toward and from the other, of a lower shaping member mounted on the lower supporting member and comprising a brim form having a central opening, a heating shell beneath the opening of sufficient size to receive the crown of the hat being shaped without contact therewith, and means for heating the brim form and heating shell; and an upper shaping member carried by the upper supporting member and comprising a yieldingly supported outer clamping ring, a part having an under face shaped to conform substantially to the shaping face of the brim form, and mounted to approach close to the brim form but not so close as to be in contact with material stretched thereon, a crown form mounted to come into operation after the clamping ring to press the material through the central opening of the brim form, and means for heating the crown form and said part.

4. In a shaping machine, the combination of a lower heated shaping die; an upper shaping member comprising a non-contacting member shaped to conform substantially to the lower die, means for heating said member, an outer clamping rim, and a central pusher; and means for causing a relative approaching movement between the lower die and the upper shaping member and for bringing the clamping rim into operation in advance of the pusher.

5. In a shaping machine, the combination of a lower shaping die, an upper shaping die shaped to conform to the lower die, an edge clamping ring surrounding the upper die, adjusting means for varying the relative final operative positions of said upper die and said clamping ring in the direction of the relative approaching movement between the upper and lower dies, means for heating said dies, and means for causing a relative approaching movement between the lower die and the upper die and clamping ring.

6. In a shaping machine, the combination of a lower brim shaping die having an arched shaping face; an upper shaping member comprising a clamping ring for clamping the edge of the material to be shaped, a die member having a transversely recessed under face shaped to conform to the lower die and formed of an outer part or section and an inner part or section, and a central pusher; the clamping ring and the outer section of the die member being vertically adjustable one relatively to the other and being yieldingly supported and standing normally in position to come into operation ahead of the pusher, and the inner section of the die member being supported to come into operation after the outer section of the die member; and means for causing a relative approaching movement between the lower die and the upper shaping member.

7. The combination with a lower brim shaping die having an arched shaping face, of a co-acting upper die having an outer part or section with a downwardly and outwardly sloping shaping face to co-act with the outer portion of the shaping face of the lower die and an inner part or section movable relatively to the outer section and having a downwardly and inwardly sloping shaping face to co-act with the inner portion of the shaping face of the lower die, and means for causing an approaching movement between said lower and upper dies and for bringing one of the upper die sections to operative position relatively to the lower die ahead of the other.

8. The combination with a lower brim-shaping die the inner portion of the brim-shaping face of which slopes inwardly and downwardly, of a co-acting upper die having an outer part or section having a shaping face shaped to co-act with the outer portion of the brim shaping face of the lower die, and an inner part or section movable relatively to the outer section and having a downwardly and inwardly sloping shaping face to co-act with the inner portion of the brim shaping face of the lower die, and means for causing an approaching movement between said lower and upper dies and for bringing the inner section of the upper die into operation after the outer section.

9. The combination with a brim shaping die the inner portion of the brim-shaping face of which slopes inwardly, of a co-acting non-contacting die formed of an outer part or section and an inner part or section movable relatively to the outer section and having a sloping face to co-act with the inner portion of said shaping die, the outer section being provided with a clamping rim whereby its movement toward the shaping die is limited and the movement of the inner section toward the shaping die being limited by engagement with the outer section, and means for causing an approaching movement between said dies with the outer section of the upper die in advance of the inner section thereof.

10. In a shaping machine, the combination of a brim shaping die, a co-acting die shaped to conform to said shaping die, means for heating said dies, a clamping ring for clamping the edge of the material to be shaped, adjusting means for varying the relative final operative positions of said co-acting die and clamping ring in the direction of the relative approaching movement of the dies, means for causing a relative approaching movement between the shaping die and the co-acting die and clamping ring, and a central pusher for stretching the material on the shaping die after the edge of the material is secured by the clamping ring.

11. In a shaping machine, the combination of a brim shaping die, a co-acting die shaped to conform to said shaping die, means for heating said dies, a clamping ring for clamping the edge of the material to be shaped, a central pusher for stretching the material on the shaping die after the edge of the material is secured by the clamping ring, means for causing a relative approaching movement between said dies, and adjusting means for causing said dies to co-act as pressing dies to press the material between them or for causing the relative approaching movement of the dies to cease while they are a sufficient distance apart to avoid contact of said co-acting die with material stretched on said shaping die.

12. In a shaping machine, the combination of two co-acting shaping dies, means for heating said dies, means for causing a relative approaching movement between said dies, and adjusting means for causing said dies to co-act as pressing dies to press the material being shaped between them or for causing the relative approaching movement of the dies to cease while they are a sufficient distance apart to avoid contact of one of said dies with material stretched on the other of said dies.

13. In a hat shaping machine, the combination of a brim shaping form, means for heating said form, a co-acting member having an edge clamping rim and a non-contacting heat-radiating face shaped to conform substantially to the shaping face of said brim shaping form, means above the heat radiating face of said co-acting member for heating said member, means for causing a relative approaching movement between said form and said co-acting member, and a central pusher for stretching the material to be shaped on said form after the edge of the material has been secured by the clamping rim.

14. In a hat shaping machine, the combination with a brim form having an arched shaping face, of means for stretching on the brim form the material to be shaped, a member having a non-contacting heat-radiating face conforming substantially to the shaping face of the brim form, means above the heat radiating face of said member for heating said member, and means for bringing said member close to, but not so close as to be in contact with, material stretched on the brim form.

15. In a hat-shaping machine, the combination of a brim form and a crown form, means for heating said forms, means for stretching the material to be shaped over said forms, members having non-contacting heat-radiating faces for radiating heat toward the outer surface of material stretched on the brim form and crown form without being in contact therewith, and means beyond the heat-radiating faces of said members in the direction away from the brim form and the crown form respectively for heating said members.

16. In a hat-shaping machine, the combination of an imperforate brim form having an arched shaping face, means for heating said brim form to provide a moisture-expelling source of heat, means for stretching on the brim form the material to be shaped, a part having a heat-radiating face conforming substantially to the shaping face of the brim form, means above the heat-radiating face of said part for heating said part, means for causing a relative approaching movement between said part and the brim form, and means for limiting said approaching movement to prevent said part from pressing against the material stretched on the brim form.

17. In a hat-shaping machine, the combination of an imperforate brim form having an arched shaping face, means for heating said form to provide a moisture-expelling source of heat, and means for stretching the material against the heated brim form with a substantial portion of its outer surface free from contact with any part of the machine.

18. In a hat shaping machine, the combination of an imperforate brim form having an arched shaping face the outer portion of which is inclined outwardly and the inner portion of which is inclined inwardly, means for heating said form to provide a moisture expelling source of heat, and means for stretching the material against the heated brim form with a substantial portion of its outer surface free from contact with any part of the machine.

19. In a hat shaping machine, the combination of an imperforate brim form having an outwardly inclined shaping surface, means for heating said form to provide a moisture expelling source of heat, and means for stretching the material against the heated brim form with a substantial portion of its outer surface free from contact with any part of the machine.

20. In a hat-shaping machine, the combination of an imperforate metal brim form having an arched shaping face, means for heating said form to provide a moisture-expelling source of heat, a clamping ring for engaging the edge of the material to be shaped, a central pusher for engaging the central portion of the material, and means for moving said clamping ring and said central pusher into operative position one in advance of the other, whereby the material will first be held by one of said members and then stretched by the other against the heated brim form, said clamping ring and pusher being formed and arranged to stretch the material on the brim form with its outer surface between the clamping ring and pusher free from contact with any part of the machine.

21. In a hat shaping machine, the combination of an imperforate brim form having an outwardly inclined shaping surface, means for heating said form to provide a moisture expelling source of heat, a clamping ring for engaging the edge of the material to be shaped, a central pusher for engaging the central portion of the material, and means for moving said clamping ring and said central pusher into operative position one in advance of the other, whereby the material will first be held by one of said members and then stretched by the other against the heated brim form, said clamping ring and pusher being formed and arranged to stretch the material on the brim form with its outer surface between the clamping ring and pusher free from contact with any part of the machine.

22. In a hat-shaping machine, the combination with an imperforate brim form having an arched shaping face, means for heating said form to provide a moisture-expelling source of heat, and means for stretching the material to be shaped on the brim form with the outer surface of its brim forming portion free from contact with any part of the machine, said last mentioned means comprising an outer holding member for engaging the edge portion of the material, an inner holding member for engaging the central portion of the material, means for causing an approaching movement between said brim form and said holding members, and adjusting means for causing the outer holding member to come into operation ahead of the inner holding member or vice versa and for varying the lead of either member relatively to the other.

23. In a hat-shaping machine, the combination with an imperforate brim form having an arched shaped face, means for heating said form to provide a moisture-expelling source of heat, and means for stretching the material to be shaped on the brim form with the outer surface of its brim forming portion free from contact with any part of the machine, said last mentioned means comprising an outer holding member for engaging the edge portion of the material, an inner holding member for engaging the central portion of the material, means for causing an approaching movement between said brim form and said holding members, and adjusting means for varying the relative time at which the outer holding member reaches its operative or holding position as compared with the inner holding member.

24. In a hat shaping machine, the combination with an imperforate brim form having an arched shaping face, means for heating said form to provide a moisture-expelling source of heat, and means for stretching the material to be shaped on the brim form with the outer surface of its brim forming portion free from contact with any part of the machine, said last mentioned means comprising an outer holding member for engaging the edge portion of the material, an inner holding member for engaging the central portion of the material, and means for causing an approaching movement between said brim form and said holding members to bring said holding members into operative or holding position with relation to the brim form one in advance of the other.

25. In a hat-shaping machine, the combination of an imperforate brim form having an arched shaping face and having a central opening, holding means for holding the edge of the material to be shaped, an imperforate crown form mounted centrally of the brim form, means for heating the brim form and the crown form to provide moisture-expelling sources of heat, means for causing a relative approaching and passing movement between the brim form and the crown form whereby the outer portion of the material will be stretched to shape against the heated brim form and the central portion of the material will be stretched to shape against the heated crown form, said parts being so formed and arranged that the material will be stretched on said forms with a substantial portion of its outer surface free from contact with any part of the machine.

26. The combination with a metal brim shaping die having a surrounding clamping shoulder, of a co-acting shaping member comprising a clamping ring for clamping the edge of the material to be shaped against said shoulder, a part having a face shaped to conform to the shaping surface of said die, means for adjusting the relative positions of the clamping ring and said part to cause said part either to act as a die to press the material against said shaping die or to approach close to without coming into pressing contact with the material on the shaping die when the edge of the material is clamped between the clamping ring and shoulder, means for heating the shaping die and said part, and means for engaging the central portion of the material to co-act with the clamping ring in stretching the material over the shaping die.

27. A member for co-acting with a brim shaping form, said member having a non-contacting heat-radiating face shaped to conform to the face of the brim form and an age clamping rim projecting beyond its heat-radiating face, and having means above its heat-radiating face for heating said face.

28. In a hat shaping machine, the combination of a brim form the inner portion of the shaping face of which slopes downwardly, means for heating said form, a clamping ring for engaging the edge of the material to be shaped, pressing means for engaging the central portion of the material, and means for causing relative movements between said form and said clamping ring and pressing means whereby the edge of the material is clamped by the clamping ring and the central portion of the material is depressed below the higher portion of the form before the edge of the material is held by the clamping ring and is further depressed to stretch the material on the form after the edge of the material has been clamped by the clamping ring.

In testimony whereof, I have hereunto set my hand, in the presence of two subscribing witnesses.

LESLIE STEVENS.

Witnesses:
 A. L. KENT,
 JEANNETTE STORK.